US012607967B2

(12) United States Patent
Kurokawa et al.

(10) Patent No.: US 12,607,967 B2
(45) Date of Patent: Apr. 21, 2026

(54) SENSOR DEVICE AND TIMEPIECE

(71) Applicant: CASIO COMPUTER CO., LTD., Tokyo (JP)

(72) Inventors: Tomoyasu Kurokawa, Kokubunji (JP); Takayuki Satou, Uenohara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 291 days.

(21) Appl. No.: 18/471,446

(22) Filed: Sep. 21, 2023

(65) Prior Publication Data

US 2024/0103446 A1 Mar. 28, 2024

(30) Foreign Application Priority Data

Sep. 26, 2022 (JP) ................................ 2022-152112

(51) Int. Cl.
*G04B 47/06* (2006.01)
*G04B 37/12* (2006.01)

(52) U.S. Cl.
CPC ........... *G04B 47/066* (2013.01); *G04B 37/12* (2013.01)

(58) Field of Classification Search
CPC ...... G04B 47/066; G04B 37/12; G04B 37/22; G04B 37/005; G01L 19/0038; G01L 19/0636; G04G 21/02; G04C 3/008; G04C 3/146
See application file for complete search history.

(56) References Cited

U.S. PATENT DOCUMENTS 4,783,772 A * 11/1988 Umemoto ............ G04B 47/066 73/754
5,357,488 A * 10/1994 Udo ..................... G04B 47/066 73/754
5,802,016 A 9/1998 Kubota et al.
6,614,726 B2 9/2003 Yamasaki et al.
10,037,008 B2 * 7/2018 Iijima .................... G04B 19/04
2001/0014056 A1 8/2001 Yamasaki et al.
2018/0259909 A1 9/2018 Kobayashi et al.

FOREIGN PATENT DOCUMENTS

CN 1314581 A 9/2001
JP H0464085 A 2/1992
JP H07225285 A 8/1995
JP H08-285963 A 11/1996
JP 2006-258558 A 9/2006
JP 2017026365 A 2/2017
JP 2018-151229 A 9/2018

OTHER PUBLICATIONS

Extended European Search Report dated Feb. 9, 2024 received in European Patent Application No. EP 23191837.6.
Notice of Reasons for Refusal dated Aug. 27, 2024 received in Japanese Patent Application No. 2022-152112.

* cited by examiner

*Primary Examiner* — Edwin A. Leon
(74) *Attorney, Agent, or Firm* — Scully, Scott, Murphy & Presser, P.C.

(57) ABSTRACT

A sensor device including a case main body, a sensor portion provided in the case main body, and an exterior member which is provided on a circumferential portion of the case main body, and has at least one first opening at a positioned shifted in a predetermined direction from an opposing direction of the sensor portion, in which a flow route where fluid is flowable into the sensor portion through at least the first opening is formed between the case main body and the exterior member.

11 Claims, 8 Drawing Sheets

SENSOR DEVICE AND TIMEPIECE

CROSS-REFERENCE TO RELATED APPLICATION

This application is based upon and claims the benefit of priority from the prior Japanese Patent Application No. 2022-152112, filed Sep. 26, 2022, the entire contents of which are incorporated herein by reference.

BACKGROUND

1. Technical Field

The present disclosure relates to a sensor device that is used in electronic devices such as wristwatches, and a timepiece equipped with the sensor device.

2. Description of the Related Art

For example, a wristwatch is known in which a sensor device has been provided in a side surface portion of a wristwatch case so as to detect pressure such as water pressure and atmospheric pressure outside the wristwatch case, as shown in Japanese Patent Application Laid-Open (Kokai) Publication No. 2018-151229.

This type of sensor device includes a sensor attachment section formed in the side surface portion of the wristwatch case, a sensor housing body arranged in the sensor attachment section, a sensor housed in the sensor housing body, a foreign substance invasion prevention member arranged on the outer surface side of the sensor housing body via a packing, and a sensor cover arranged on the outer surface side of the foreign substance invasion prevention member.

This sensor device is structured such that the sensor housing body having the housed sensor, the foreign substance invasion prevention member, and the sensor cover are attached by a plurality of screws to the sensor attachment section of the wristwatch case while coaxially corresponding to one another in this order.

SUMMARY

One embodiment is a sensor device comprising: a case main body; a sensor portion provided in the case main body; and an exterior member which is provided on a circumferential portion of the case main body, and has at least one first opening at a positioned shifted in a predetermined direction from an opposing direction of the sensor portion, wherein a flow route where fluid is flowable into the sensor portion through at least the first opening is formed between the case main body and the exterior member.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 8A and FIG. 8B are diagrams showing the decorative member of FIG. 6 when viewed from inside the wristwatch case, of which FIG. 8A is an enlarged side view thereof and FIG. 8B is an enlarged perspective view of a main portion thereof.

DETAILED DESCRIPTION OF THE PREFERRED EMBODIMENT

An embodiment in which the present invention has been applied in a wristwatch will hereinafter be described with reference to FIG. 1 to FIG. 8B.

Figure 1:
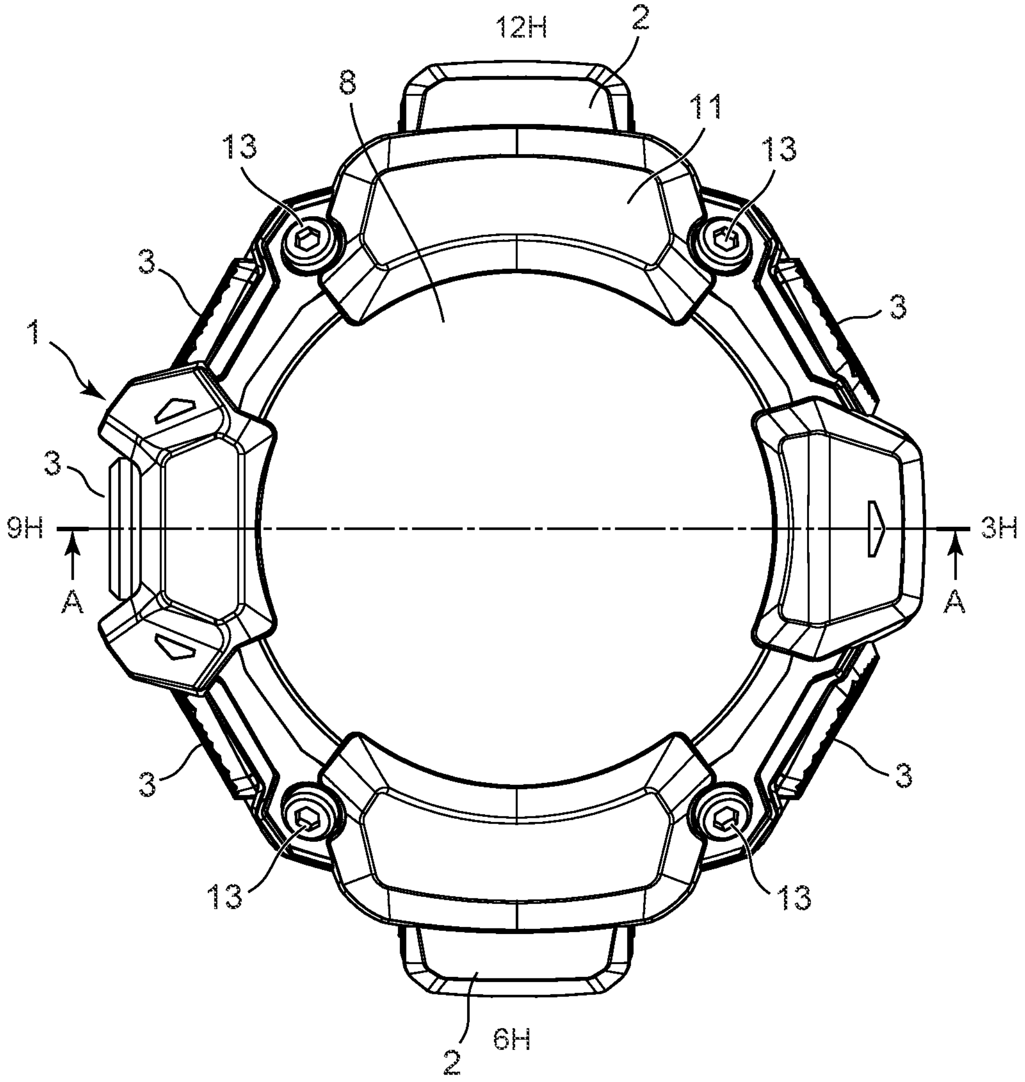
FIG. 1 is an enlarged front view showing an embodiment of a wristwatch in which the present invention has been applied.
Figure 2:
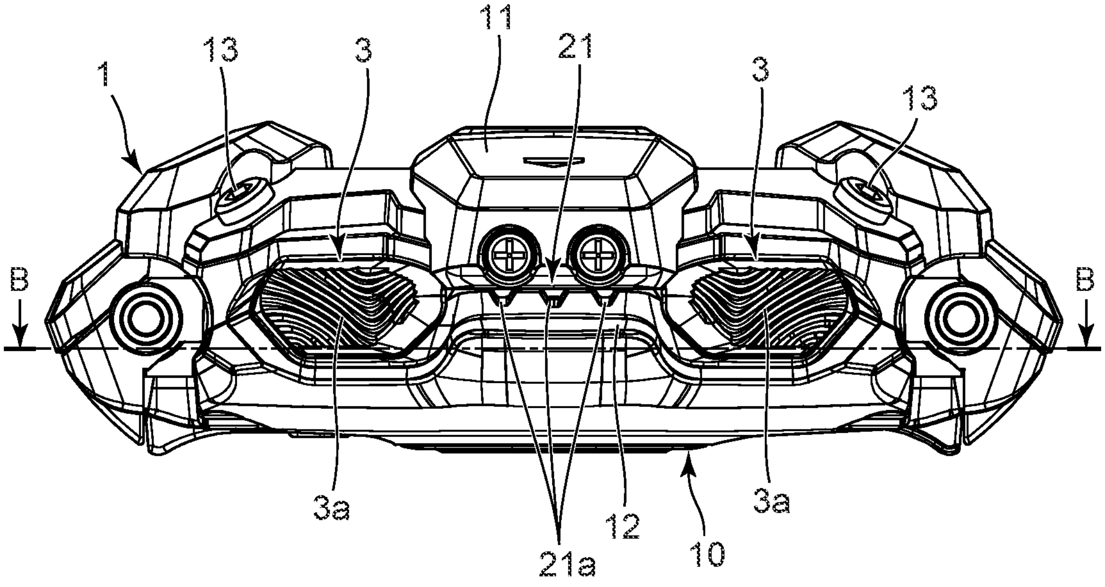
FIG. 2 is an enlarged side view showing the three o'clock side of the wristwatch in FIG. 1.

This wristwatch includes a wristwatch case 1 that serves as its main body, as shown in FIG. 1 and FIG. 2. On the twelve o'clock side and six o'clock side of the wristwatch case 1, band attachment sections 2 are provided to which watch bands (not shown in the drawings) are attached. In addition, on the two o'clock side, four o'clock side, eight o'clock side, nine o'clock side, and ten o'clock side of the wristwatch case 1, push button switches 3 are provided.

Figure 3:
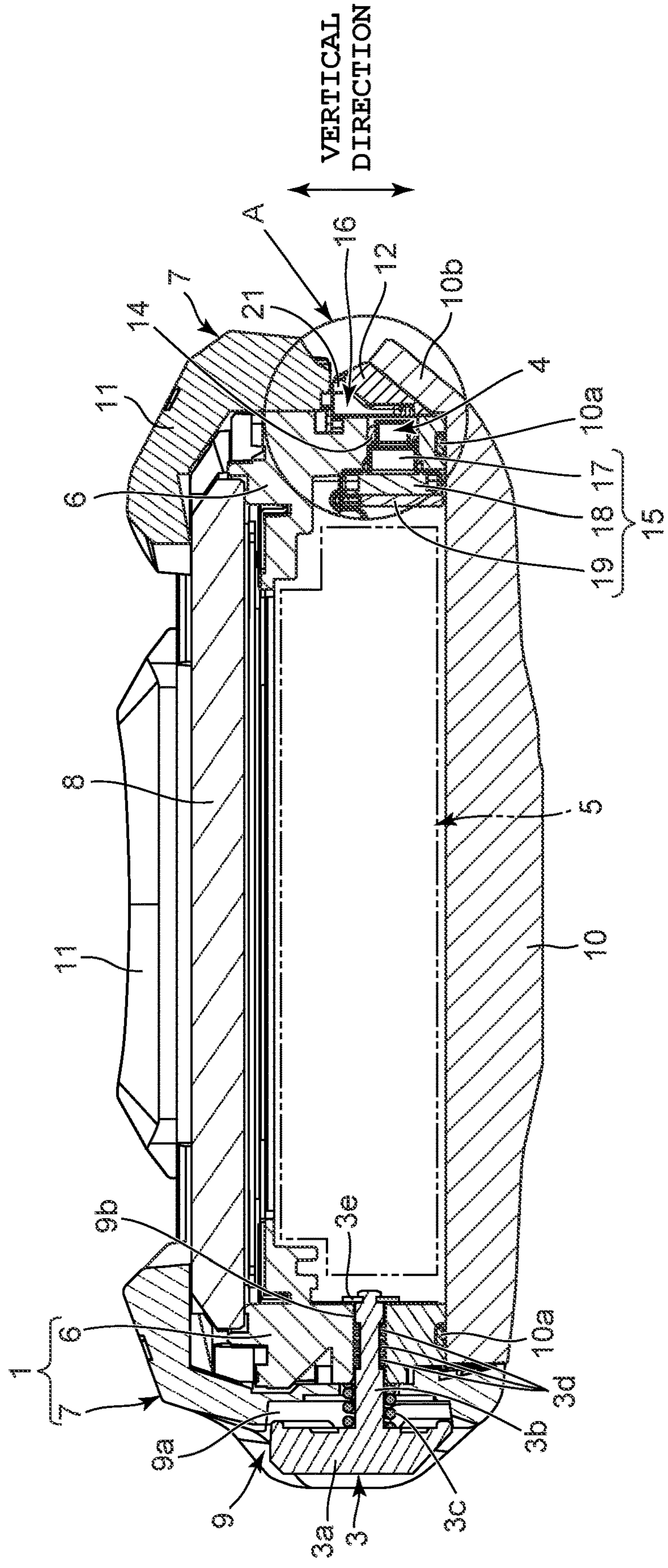
FIG. 3 is an enlarged sectional view of the wristwatch taken along the A-A arrow view in FIG. 1.

Moreover, on the three o'clock side of the wristwatch case 1, a sensor device 4 described later is provided, as shown in FIG. 1 to FIG. 3. Furthermore, in the wristwatch case 1, a timepiece module 5 is provided. Although not shown in the drawings, this timepiece module 5 includes various types of components required for timepiece functions, such as a timepiece movement which moves pointers to indicate the time, a display section which electro-optically displays information required for timepiece functions such as information regarding a time of day, a day of the week, and a date, and a circuit section which electrically drives and controls the timepiece movement and the display section.

This wristwatch case 1 includes a case main body 6 and an exterior member 7, as shown in FIG. 1 to FIG. 3. The case main body 6 is made of a highly rigid synthetic resin or metal. To the upper opening of the case main body 6, a watch glass 8 is attached. In addition, to the lower part of the case main body 6, a back cover 10 which is a cover body is attached via a packing 10*a*. The exterior member 7, which is arranged covering the outer circumferential part of the case main body 6, includes an exterior case 11 and a decorative member 12 that is a side part member.

The exterior case 11 is made of a synthetic resin having elasticity, such as urethane resin, as shown in FIG. 1 to FIG. 3. This exterior case 11 is attached covering the outer surface of the case main body 6 by a plurality of screws 13. In portions of this exterior case 11 on the two o'clock side, the four o'clock side, the eight o'clock side, the nine o'clock side, and the ten o'clock side, buttonhole sections 9*a* of switch attachment sections 9 are formed in which button head sections 3*a* of the push button switches 3 are arranged.

The decorative member 12 is highly decorative and made of a soft synthetic resin such as urethane resin, as shown in FIG. 2 to FIG. 5. In order to achieve the high decorativeness, the decorative member 12 has a color that adds an accent to the wristwatch case 1. This decorative member 12 is arranged on the three o'clock side of the case main body 6 in a manner to be positioned extending from the buttonhole section 9*a* of the switch attachment section 9 on the two o'clock side of the exterior case 11 to the buttonhole section 9*a* of the switch attachment section 9 on the four o'clock side of the exterior case 11.

Figure 6:
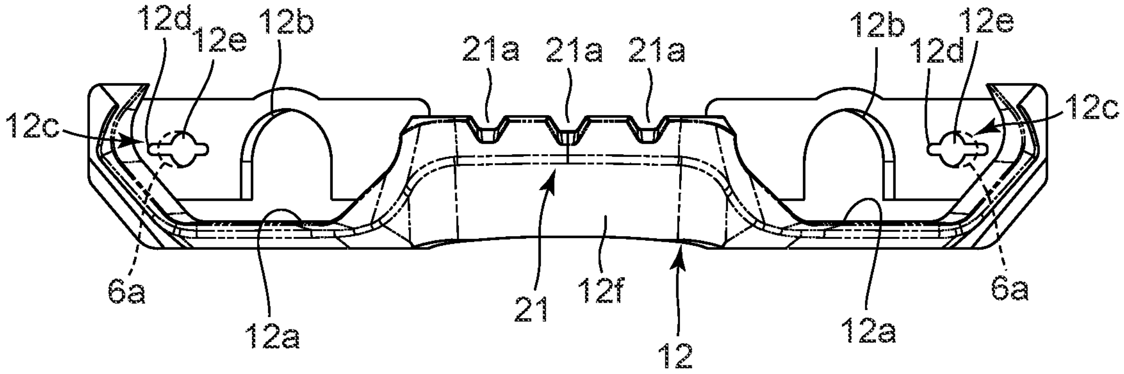
FIG. 6 is an enlarged side view of a decorative member for a wristwatch case shown in FIG. 5 when viewed from outside the wristwatch case.
Figure 7:
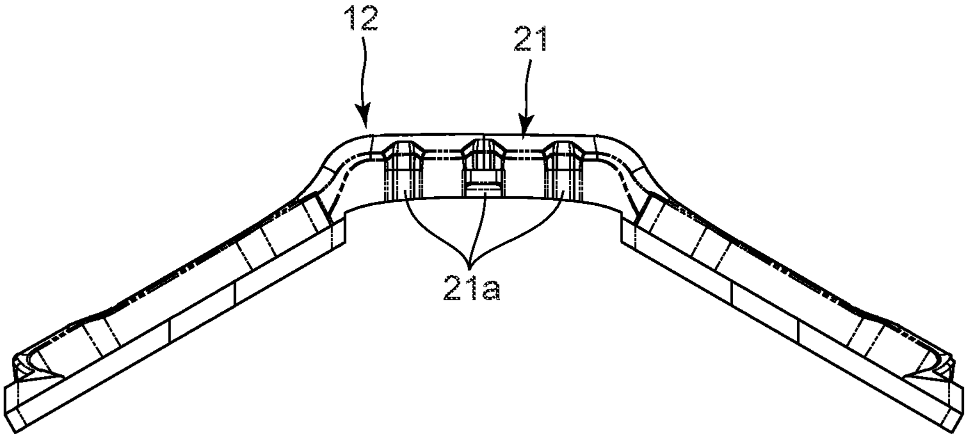
FIG. 7 is an enlarged planar view of the decorative member shown in FIG. 6 when viewed from above.
Figure 8A:
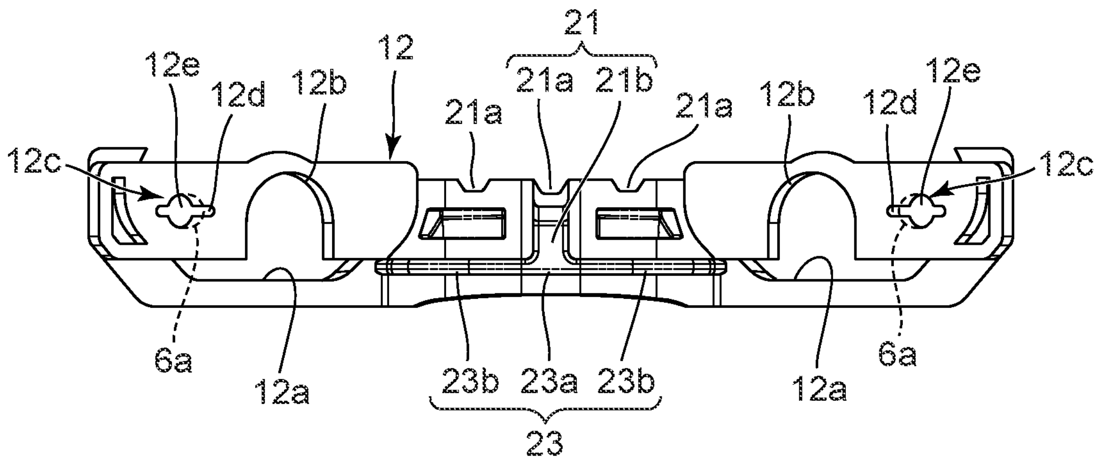

In side portions of the decorative member 12, or more specifically, in portions of the decorative member 12 corresponding to the buttonhole sections 9*a* on the two o'clock side and the four o'clock side, buttonhole cutout sections 12*a* are formed in which the lower halves of the button head sections 3*a* of the corresponding push button switches 3 are arranged, as shown in FIG. 6 and FIG. 8A. Here, each buttonhole cutout section 12*a* includes a shaft insertion cutout section 12*b* into which a button shaft 3*b* of the corresponding push button switch 3 is inserted, and a temporarily holding section (fixing section) 12*c* which temporarily holds (temporarily fixes) the decorative member 12 on the outer surface of the case main body 6.

The temporarily holding section 12*c* includes a hole section into which a corresponding boss section 6*a* formed on the outer surface of the case main body 6 is inserted, as shown in FIG. 6 and FIG. 8A. This hole section is constituted by a long hole section 12*d* and a circular hole section 12*e*. The circular hole section 12*e* of the temporarily holding section 12*c* is formed in a middle portion of the long hole section 12*d* such that its inner diameter is shorter than the outer diameter of the boss section 6*a* of the case main body 6 and greater than the width of the long hole section 12*d* in a direction perpendicular to a longitudinal direction of the long hole section 12*d*.

As a result, the temporarily holding section 12*c* is structured such that, when inserted into the circular hole section 12*e*, the boss section 6*a* formed on the outer surface of the case main body 6 stretches the circular hole section 12*e* and the long hole section 12*d*, and then the stretched circular hole section 12*e* elastically holds the boss section 6*a*, whereby the decorative member 12 is temporarily fixed on the outer surface of the case main body 6, as shown in FIG. 6 and FIG. 8A.

Also, the decorative member 12 is held down on the outer surface of the case main body 6 by a hold-down section 10*b* provided on the back cover 10, as shown in FIG. 2 to FIG. 5. The hold-down section 10*b* is provided while being inclined obliquely upward from the three o'clock side of the back cover 10. Accordingly, on the outer surface of the decorative member 12, an inclined section 12*f* against which the hold-down section 10*b* of the back cover 10 is pressed is provided while being inclined at the same inclination angle as that of the hold-down section 10*b*.

Figure 4:
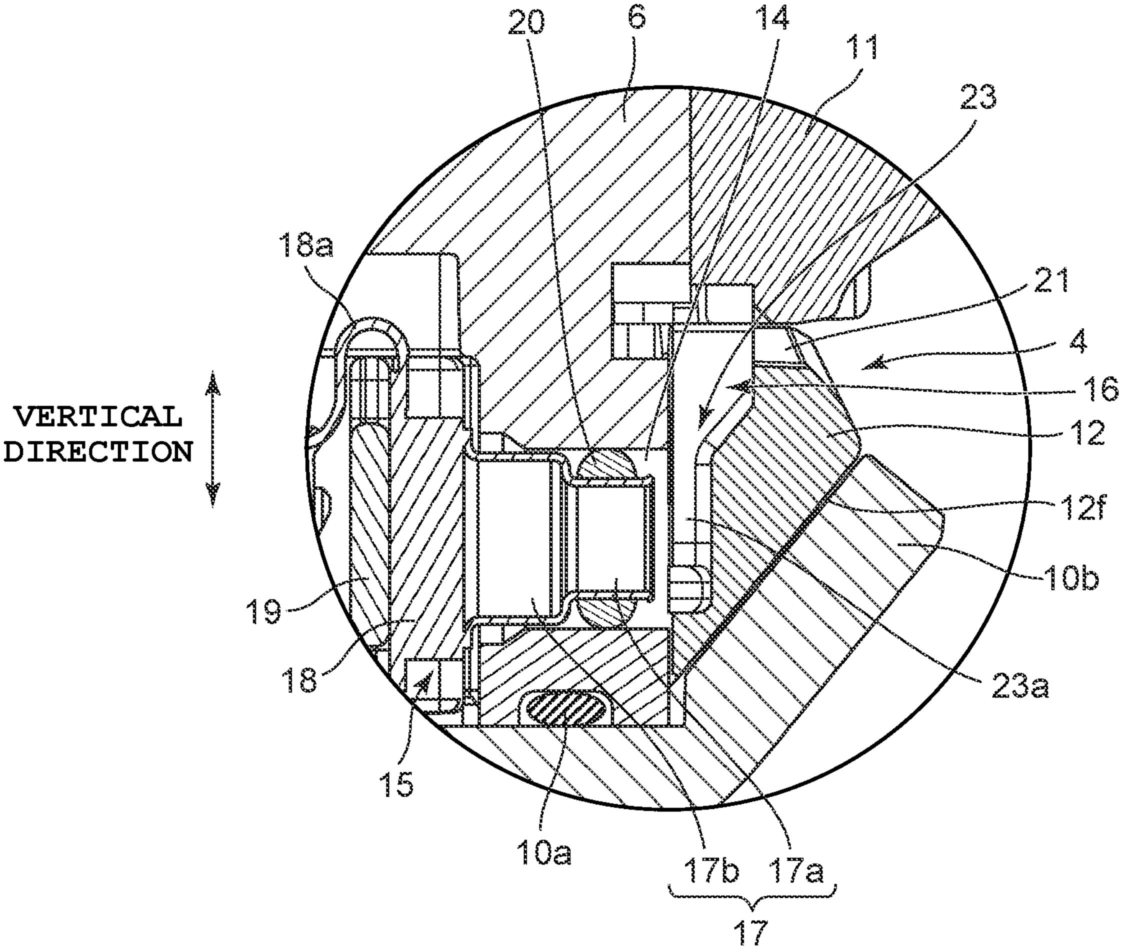
FIG. 4 is an enlarged sectional view showing portion A of the wristwatch shown in FIG. 3.

As a result, the decorative member 12 is structured to be held down and fixed on the outer surface of the case main body 6 by the hold-down section 10*b* of the back cover 10 when the back cover 10 is attached to the lower part of the case main body 6 with the decorative member 12 being temporarily held on the outer surface of the case main body 6 and the hold-down section 10*b* is pressed against the inclined section 12*f* of the decorative member 12, as shown in FIG. 4. That is, the decorative member 12 is held and fixed between the case main body 6 and the hold-down section 10*b*.

Figure 5:
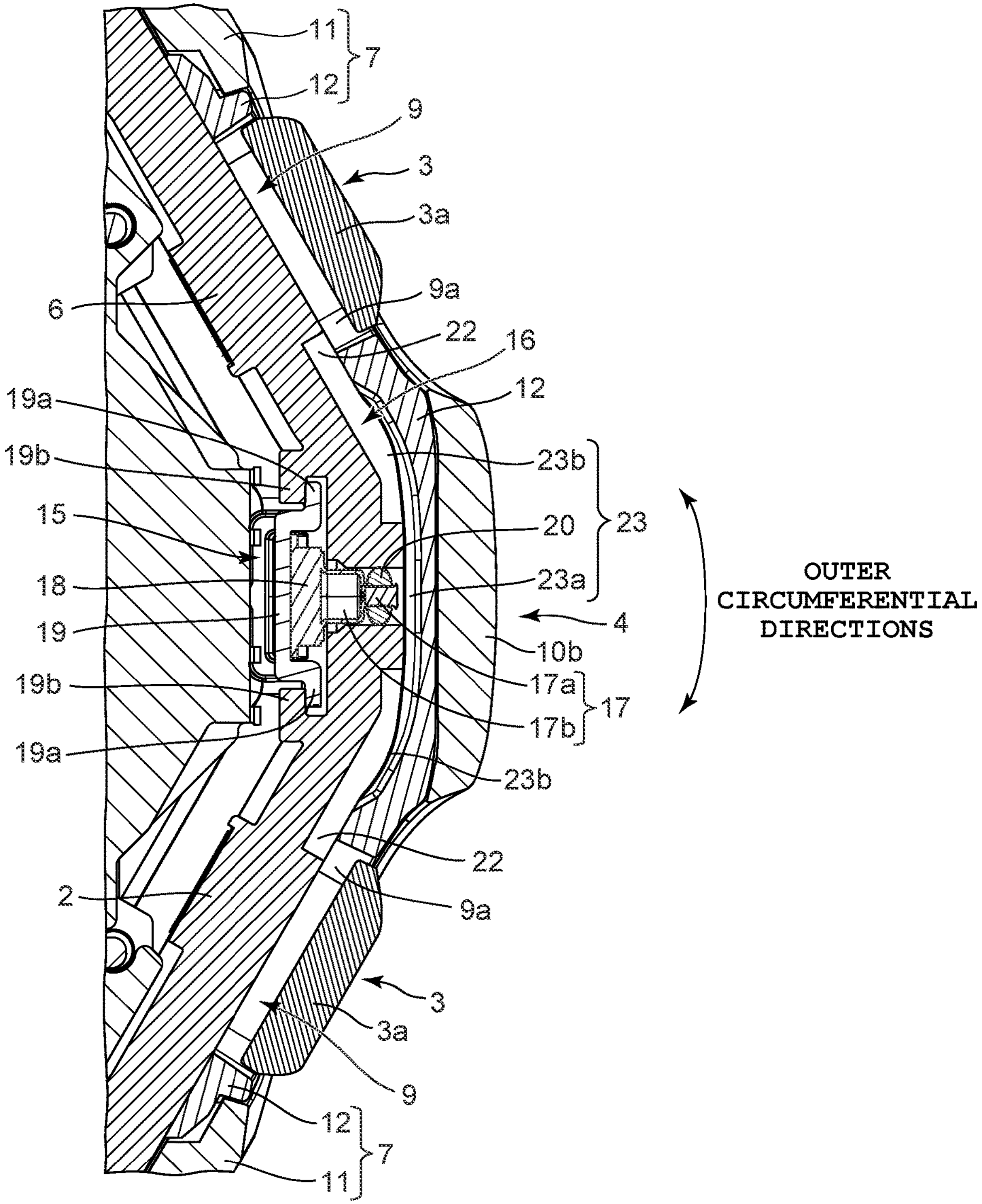
FIG. 5 is an enlarged sectional view showing a main portion of the wristwatch taken along the B-B arrow view in FIG. 2.

As for the plurality of switch attachment sections 9, each switch attachment section 9 includes the above-described buttonhole section 9*a* and a button attachment hole 9*b*, as shown in FIG. 3 to FIG. 5. The buttonhole section 9*a* is formed in the exterior case 11 and structured such that the button head section 3*a* of the corresponding push button switch 3 is slidably arranged therein. The button attachment hole 9*b* is formed penetrating through the case main body 6 from the bottom of the buttonhole section 9*a* and structured such that the button shaft 3*b* of the push button switch 3 is slidably inserted thereinto.

On the other hand, each of the plurality of push button switches 3 includes the above-described button head section 3*a*, the above-described button shaft 3*b*, and a spring member 3*c*, as shown in FIG. 3. The button shaft 3*b* has a plurality of waterproof rings 3*d* provided on its outer circumferential surface, and is structured to be slidably inserted with the plurality of waterproof rings 3*d* into the corresponding button attachment hole 9*b* formed penetrating through the case main body 6 from the bottom of the corresponding buttonhole section 9*a* of the exterior case 11. The button head section 3*a* is provided on the outer end of the button shaft 3*b*, and structured to be slidably arranged in the buttonhole section 9*a* of the exterior case 11.

The spring member 3*c* is a coil spring and formed such that its outer diameter is shorter than the outer diameter of the button head section 3*a* and its inner diameter is greater than the outer diameter of the button shaft 3*b*, as shown in FIG. 3. This spring member 3*c* is structured to force the button head section 3*a* in a direction in which the button head section 3*a* is pressed out of the wristwatch case 1 when this spring member 3*c* is arranged around the outer circumferential surface of the button shaft 3*b* such that its one end portion resiliently comes in contact with the inner surface of the button head section 3*a* and its other end portion resiliently comes in contact with the bottom of the buttonhole section 9*a*.

Also, each of the plurality of push button switches 3 has a stopper member 3*e* such as an E-ring attached to an inner end portion of its button shaft 3*b* protruding inside the case main body 6, as shown in FIG. 3. As a result, each push button switch 3 is structured such that, when its button head section 3*a* is forced toward the outside of the wristwatch case 1 by the spring force of its spring member 3*c*, the stopper member 3*e* attached to the inner end portion of its button shaft 3*b* comes in contact with the inner surface of the case main body 6, whereby the button shaft 3*b* does not slip out of the corresponding button attachment hole 9*b* toward the outside of the wristwatch case 1.

Moreover, each of the plurality of push button switches 3 is structured such that, when its button head section 3*a* is pushed against the spring force of its spring member 3*c*, the inner end of its button shaft 3*b* is pushed into the case main body 6 and brings a contact plate (not shown in the drawings) of the timepiece module 5 into contact with a contact point (not shown in the drawings) of the timepiece module 5, whereby a switching operation is performed, as shown in FIG. 3.

On the other hand, the sensor device 4 includes a sensor attachment section 14 provided on the three o'clock side of the case main body 6 of the wristwatch case 1, a sensor section which is attached to the sensor attachment section 14, a flow route 16 which has a first flow port 21 that is a first opening formed in a portion of the wristwatch case 1 at a position shifted from the sensor attachment section 14, that is, a position not opposing the sensor attachment section 14, and through which fluid such as gas or liquid outside the wristwatch case 1 flows from the first flow port 21 to the sensor section 15, as shown in FIG. 3 to FIG. 5.

The sensor attachment section 14, which is an attachment hole where the sensor section 15 is attached and housed, is formed on the lower side of a side portion of the case main body 6 on the three o'clock side, that is, the back cover 10 side of a side portion of the case main body 6 on the three o'clock side which is located under the middle part of the case main body 6 in a vertical direction, and positioned penetrating from the outer part of the case main body 6 toward the inner part thereof, as shown in FIG. 3 to FIG. 5.

The sensor section 15 is to detect pressure such as atmospheric pressure and water pressure outside the wristwatch case 1, as shown in FIG. 3 to FIG. 5. This sensor section 15 includes a detection cylindrical section 17, a sensor element 18, and a sensor hold-down member 19. The detection cylindrical section 17, into which fluid such as gas or liquid outside the wristwatch case 1 flows, includes a small-diameter cylindrical section 17*a* and a large-diameter cylindrical section 17*b*, and is structured such that these sections are arranged in the sensor attachment section 14 of the case main body 6.

The above-described detection cylindrical section 17 is structured to be arranged in the sensor attachment section 14 of the case main body 6 together with a waterproof ring 20 attached to the outer circumferential part of the small-diameter cylindrical section 17*a*, as shown in FIG. 4 and FIG. 5. This detection cylindrical section 17 is structured such that, by the waterproof ring 20 being coming in pressure contact with the outer circumferential surface of the small-diameter cylindrical section 17*a* and the inner circumferential surface of the sensor attachment section 14, waterproofing between the outer circumferential surface of the small-diameter cylindrical section 17*a* and the inner circumferential surface of the sensor attachment section 14 is achieved.

The sensor element 18 is a pressure sensor that detects pressure such as atmospheric pressure and water pressure, and is provided on an end portion of the detection cylindrical section 17, or more specifically, an end portion of the large-diameter cylindrical section 17*b* located on the inner side of case main body 6, as shown in FIG. 4 and FIG. 5. This sensor element 18 is electrically connected to a circuit section (not shown in the drawings) of the timepiece module in the case main body 6 by a flexible wiring substrate 18*a*.

The sensor hold-down member 19, which holds down the sensor element 18 on the sensor attachment section 14 of the case main body 6, is structured to prevent the detection cylindrical section 17 and the sensor element 18 from being slipped out from the sensor attachment section 14 toward the inner side of the case main body 6 due to the pressure of a fluid that has flowed into the sensor attachment section 14, as shown in FIG. 4 and FIG. 5.

This sensor hold-down member 19, which has a substantially plate shape whose sides are provided with engaging sections 19*a*, is structured such that the engaging sections 19*a* are positioned close to the sides of the sensor element 18 and engaged with hook sections 19*b* provided on the inner surface of the case main body 6, whereby the sensor element 18 is pressed against and fixed to the sensor attachment section 14, as shown in FIG. 5.

On the other hand, the flow route 16 is to lead fluid such as gas or liquid outside the wristwatch case 1 to the sensor section 15 in the sensor attachment section 14, as shown in FIG. 3 to FIG. 5. This flow route 16 is formed between the case main body 6 of the wristwatch case 1 and the exterior members 7, or more specifically, between the case main body 6 and the decorative member 12 of the exterior member 7 with the first flow port 21, which is the first opening, being formed in a portion of the exterior member 7 at the position shifted from (not opposing) the sensor attachment section 14.

This flow route 16 includes the first flow port 21 formed at the position shifted from the sensor attachment section 14 of the case main body 6, two second flow ports 22 which are second openings formed at positions different from that of the first flow port 21, and a flow path 23 formed between and connected to the first and second flow ports 21 and 22 in a manner to be connected to the sensor attachment section 14, as shown in FIG. 4 and FIG. 5.

The first flow port 21 is formed in the above-described portion of the exterior member 7 and positioned substantially in the vertical middle of a side portion of the wristwatch case 1 on the three o'clock side, as shown in FIG. 2 to FIG. 4. That is, the first flow port 21 is required to be formed at a position shifted from the sensor attachment section 14 in a front or back direction (a vertical direction that is a thickness direction) of the wristwatch case 1. In the present embodiment, the first flow port 21 is formed at a position shifted above the sensor attachment section 14 (a position not opposing the sensor attachment section 14). More specifically, the first flow port 21 is located between a lower end portion of the exterior case 11 on the three o'clock side of the wristwatch case 1 and an upper end portion of the decorative member 12 opposing this lower end portion.

At a position shifted above the sensor attachment section 14, or more specifically, at a position at the upper end portion of the decorative member 12 corresponding to the lower end portion of the exterior case 11, a plurality of recessed grooves 21*a* is formed as shown in FIG. 4, and FIG. 6 to FIG. 8B, and the above-described first flow port 21 is constituted by the recessed groove 21*a* located in the middle among these recessed grooves 21*a* and a connection groove 21*b* vertically formed in an inner surface portion of the decorative member 12 corresponding to this middle recessed groove 21*a*.

Among the plurality of recessed grooves 21*a*, the two recessed grooves 21*a* located to the sides of the middle recessed groove 21*a* are dummy grooves which are not connected to the flow path 23 of the flow route 16 by being blocked by the case main body 6, as shown in FIG. 4 and FIG. 6 to FIG. 8B. The reason for having these dummy grooves is that, by the plural recessed grooves 21*a* being formed, the design and decorativeness of the first flow port 21 are enhanced.

Figure 8B:
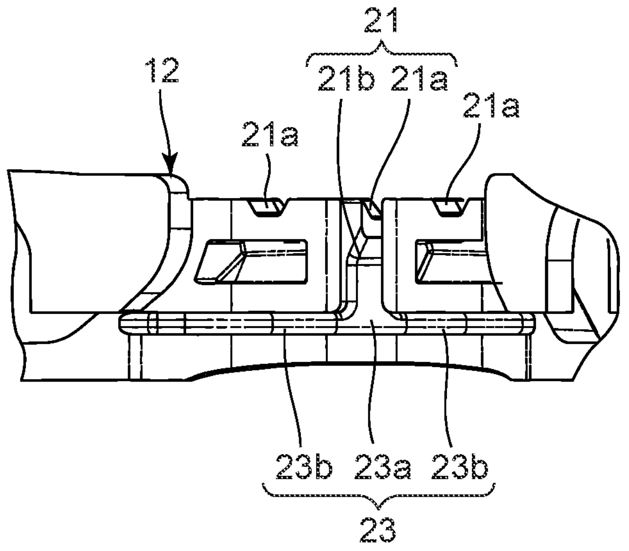

The connection groove 21*b* of the first flow port 21 is vertically formed in the inner surface portion of the decorative member 12 corresponding to the middle recessed groove 21*a* of the plurality of recessed grooves 21*a*, and thereby connects the middle recessed groove 21*a* with the flow path 23 of the flow route 16, as shown in FIG. 8A and FIG. 8B.

As a result, the flow route 16 is formed such that fluid such as gas or liquid outside wristwatch case 1 is taken into the flow path 23 through the one recessed groove 21*a* which is located in the middle among the plurality of recessed grooves 21*a* and constitutes the first flow port 21 and the connection groove 21*b* which also constitutes the first flow port 21, and sent to the sensor attachment section 14 from the flow path 23, as shown in FIG. 4, and FIG. 6 to FIG. 8B.

Also, this flow route 16 is formed such that fluid sent to the sensor attachment section 14 is taken into the middle recessed groove 21*a* of the plurality of recessed grooves 21*a* from the flow path 23 through the connection groove 21*b* of the first flow port 21, and discharged outside the wristwatch case 1 from this middle recessed groove 21*a*, as shown in FIG. 4, and FIG. 6 to FIG. 8B.

The first flow port 21 is structured such that only the plurality of recessed grooves 21*a* formed in the upper end of the decorative member 12 corresponding to the lower end of the exterior case 11 can be seen from outside the wristwatch case 1 as shown in FIG. 2, and the sensor attachment section 14, the sensor section 15, and the second flow ports 22 and the flow path 23 of the flow route 16 cannot be seen from outside the wristwatch case 1 as shown in FIG. 4.

That is, the sensor attachment section 14, the sensor section 15, and the flow route 16 excluding the first flow port 21 are covered by the decorative member 12, as shown in FIG. 4. As a result, the wristwatch case 1 is structured such that, even though the sensor device 4 is provided therein, this sensor device 4 cannot be seen from outside the wristwatch case 1 and only the plurality of recessed grooves 21*a* can be seen from outside the wristwatch case 1, whereby the outer appearance and design are not impaired by the sensor device 4.

The two second flow ports 22 are formed extending at positions shifted along the outer circumference of the wristwatch case 1 with respect to the sensor attachment section 14, that is, at positions on the two o'clock side and four o'clock side of the outer circumferential part of the wristwatch case 1, and thereby located at positions shifted from the sensor attachment section 14 (positions not opposing the sensor attachment section 14), as shown in FIG. 5.

These two second flow ports 22 are two grooves formed in the outer surface of the case main body 6 in a manner to extend toward the sensor attachment section 14 from portions of the case main body 6 corresponding to the two switch attachment sections 9 located on the two o'clock side and the four o'clock side, as shown in FIG. 5. Also, these two second flow ports 22 are connected to the buttonhole section 9*a* of the switch attachment section 9 on the two o'clock side of the case main body 6 and the buttonhole section 9*a* of the switch attachment section 9 on the four o'clock side of the case main body 6.

As a result, the flow route 16 is formed such that fluid such as gas or liquid outside the wristwatch case 1 is taken into the flow path 23 from the buttonhole sections 9*a* of the two switch attachment sections 9 on the two o'clock side and the four o'clock side through the two second flow ports 22, and sent to the sensor attachment section 14 from the flow path 23, as shown in FIG. 5.

In addition, this flow route 16 is formed such that fluid sent to the sensor attachment section 14 is sent to the buttonhole sections 9*a* of the two switch attachment sections 9 on the two o'clock side and the four o'clock side from the flow path 23 through the two second flow ports 22, and discharged outside the wristwatch case 1 from the buttonhole sections 9*a* on the two o'clock side and the four o'clock side.

Also, these two second flow ports 22 are structured to reach and be connected to the buttonhole sections 9*a* of the two switch attachment sections 9 which are formed on the two o'clock side and the four o'clock side and to which the corresponding push button switches 3 are attached, and thereby covered by the button head sections 3*a* of the push button switches 3 in the buttonhole sections 9*a* so as not be seen from outside the wristwatch case 1, as shown in FIG. 5.

The flow path 23 of the flow route 16 includes a first flow path 23*a* formed extending to the sensor attachment section 14 of the case main body 6 from the first flow port 21, and two second flow paths 23*b* formed extending to the two second flow ports 22 on the two o'clock side and the four o'clock side from the sensor attachment section 14 of the case main body 6, as shown in FIG. 4, FIG. 5, and FIG. 8.

The first flow path 23*a* is a groove formed in the lower part of the inner surface of the decorative member 12 and located extending to the sensor attachment section 14 of the case main body 6 from the first flow port 21, as shown in FIG. 4, FIG. 5, and FIG. 8. This first flow path 23*a* is formed such that its groove width is substantially equal to those of the recessed groove 21*a* and the connection groove 21*b* of the first flow port 21.

As a result, the flow path 23 is structured such that, when a foreign substance such as a particle whose diameter is equal to or shorter than the groove width of the first flow path 23*a* enters from the first flow port 21, this substance passes through the first flow path 23*a*, and is taken into the sensor attachment section 14 of the case main body 6 and then discharged outside the wristwatch case 1 from the first flow port 21 through the first flow path 23*a*, as shown in FIG. 4, FIG. 5, and FIG. 8.

On the other hand, the two second flow paths 23*b* are each formed by a groove formed in the lower part of the inner surface of the decorative member 12 and a groove formed in the outer surface of the case main body 6, as shown in FIG. 5 and FIG. 8. The grooves formed in the inner surface of the decorative member 12 have lengths extending from the first flow path 23*a* corresponding to the sensor attachment section 14 of the case main body 6 toward the two o'clock side and four o'clock side of the case main body 6 such that the leading ends of these grooves approach the second flow ports 22 on the two o'clock side and the four o'clock side.

Also, the grooves of the second flow paths 23*b* formed in the outer surface of the case main body 6 have lengths extending from portions of the outer surface of the case main body 6 close to the first flow path 23*a* corresponding to the sensor attachment section 14 of the case main body 6 toward the two o'clock side and four o'clock side of the case main body 6 such that the leading ends of these grooves reach the second flow ports 22 on the two o'clock side and the four o'clock side, as shown in FIG. 5. Consequently, the second flow paths 23*b* are formed such that the grooves formed in the inner surface of the decorative member 12 and the grooves formed in the outer surface of the case main body 6 oppose one another.

As a result, the flow path 23 is structured such that, when a foreign substance such as a particle whose diameter is shorter than the groove width of each second flow port 22 and the groove width of the first flow path 23*a* enters from each of the two second flow ports 22, these foreign substances pass through the second flow paths 23*b*, and are taken into the sensor attachment section 14 of the case main body 6 from the first flow path 23*a*, as shown in FIG. 5.

Also, this flow path 23 is structured such that foreign substances taken into the sensor attachment section 14 are discharged outside the wristwatch case 1 through the first flow path 23*a* and the first flow port 21, and also sent to the two second flow ports 22 through the first flow path 23*a* and the two second flow paths 23*b* so as to be discharged outside the wristwatch case 1 through the second flow ports 22, as shown in FIG. 4 and FIG. 5.

Moreover, this flow path 23 is structured such that, when a foreign substance such as a particle whose diameter is shorter than the groove width of each second flow port 22 and larger than the groove width of the first flow path 23*a* enters from each of the two second flow ports 22, these foreign substances are stopped at the first flow path 23*a* after passing through the two second flow paths 23*b*, and then discharged outside the wristwatch case 1 from the second flow ports 22 through the second flow paths 23*b*, as shown in FIG. 5.

Next, a procedure for assembling this wristwatch is described.

In this assembly, first, the watch glass 8 is attached to the upper opening of the case main body 6. In this state, the exterior case 11 of the exterior member 7 is arranged covering the outer circumferential part of the case main body 6, and attached to the case main body 6 by the plurality of screws 13. Here, the buttonhole sections 9*a* of the plurality of switch attachment sections 9 formed in the exterior case 11 are arranged coaxially corresponding to the button attachment holes 9*b* of the switch attachment sections 9 formed on the two o'clock side, four o'clock side, eight o'clock side, nine o'clock side, and ten o'clock side of the case main body 6.

In this state, the decorative member 12 of the exterior member 7 is arranged on the three o'clock side of the case main body 6 so as to cover the sensor attachment section 14. Here, the buttonhole cutout sections 12*a* formed in the side portions of the decorative member 12 are positioned corresponding to the lower sides of the buttonhole sections 9*a* of the switch attachment sections 9 in the exterior case 11, and the shaft insertion cutout sections 12*b* corresponding to the buttonhole cutout sections 12*a* are positioned coaxially corresponding to the button attachment holes 9*b* of the switch attachment sections 9 formed on the two o'clock side, four o'clock side, eight o'clock side, nine o'clock side, and ten o'clock side of the case main body 6.

Then, the decorative member 12 is temporarily held on the outer surface of the case main body 6 by the temporarily holding sections 12*c*. Here, the boss sections 6*a* provided on the outer surface of the case main body 6 are inserted into the circular hole sections 12*e*. Accordingly, the circular hole sections 12*e* are stretched by the boss sections 6*a* of the case main body 6 together with the long hole sections 12*d*, and then elastically hold the boss sections 6*a*, whereby the temporarily holding sections 12*c* temporarily hold the decorative member 12 on the outer surface the case main body 6 on the three o'clock side.

As a result, in the area between the inner surface of the temporarily held decorative member 12 and the outer surface of the case main body 6, the flow route 16 which leads fluid such as gas or liquid outside the wristwatch case 1 to the sensor attachment section 14 is formed except for its first flow port 21. The first flow port 21 of this flow route 16 is formed by the connection groove 21*b* extending to the flow path 23 of the flow route 16 from the one recessed groove 21*a* located in the middle among the plurality of recessed grooves 21*a* formed in the upper end of the decorative member 12 positioned on the three o'clock side.

Also, the second flow ports 22 of the flow route 16 are formed by the portions of the decorative member 12 close to the two o'clock side and the four o'clock side covering the grooves formed in the portions of the case main body 6 close to the two o'clock side and the four o'clock side and connected to the buttonhole sections 9*a* of the two switch attachment sections 9 on the two o'clock side and the four o'clock side.

Moreover, the first flow path 23*a* of the flow path 23 of the flow route 16 is formed by the groove formed in the inner surface of the decorative member 12 and extending to the sensor attachment section 14 from the first flow port 21. Furthermore, the second flow paths 23*b* of the flow path 23 of the flow route 16 are formed by the grooves formed in the inner surface of the decorative member 12 and the grooves formed in the outer surface of the case main body 6 opposing one another.

Then, the pushbutton switches 3 are attached to the switch attachment sections 9 of the wristwatch case 1 on the two o'clock side, the four o'clock side, the eight o'clock side, the nine o'clock side, and the ten o'clock side. Here, before this attachment, the plurality of waterproof rings 3*d* is attached to the outer circumferential surfaces of the button shafts 3*b* of the pushbutton switches 3, and the spring members 3*c* are arranged around the button shafts 3*b*. In this state, the button shafts 3*b* of the pushbutton switches 3 are inserted into the button attachment holes 9*b* of the case main body 6 through the buttonhole sections 9*a* of the exterior case 11 such that the inner end portions of the button shafts 3*b* protrude into the case main body 6.

Here, the plurality of waterproof rings 3*d* provided on the outer circumferential surfaces of the button shafts 3*b* come in pressure contact with the inner circumferential surfaces of the button attachment holes 9*b* of the case main body 6, whereby waterproofing between the outer circumferential surface of each button shaft 3*b* and the inner circumferential surface of each button attachment hole 9*b* is achieved. Also, one end of each spring member 3*c* arranged around the corresponding button shaft 3*b* resiliently comes in contact with the inner surface of the corresponding button head section 3*a*, and the other end of each spring member 3*c* resiliently comes in contact with the bottom of the corresponding buttonhole section 9*a* of the exterior case 11, whereby the push button switches 3 are forced in directions in which they are pushed toward the outside of the wristwatch case 1 by the spring force of each spring member 3*c*. In this state, the stopper members 3*e* are attached to the inner end portions of the button shafts 3*b* protruding inside the case main body 6.

Also, the sensor section 15 is attached to the sensor attachment section 14 provided on the three o'clock side of the case main body 6. Here, before this attachment, the sensor element 18 is attached to the end portion of the large-diameter cylindrical section 17*b* of the detection cylindrical section 17 of the sensor section 15, and the flexible wiring substrate 18*a* is attached and electrically connected to the sensor element 18.

In this state, the waterproof ring 20 is attached to the outer circumferential part of the small-diameter cylindrical section 17*a* of the detection cylindrical section 17, and the detection cylindrical section 17 is fitted into the sensor attachment section 14 of the case main body 6. Here, the waterproof ring 20 attached to the outer circumferential part of the small-diameter cylindrical section 17*a* of the detection cylindrical section 17 come in pressure contact with the inner circumferential surface of the sensor attachment section 14 of the case main body 6, whereby waterproofing between the outer circumferential surface of the small-diameter cylindrical section 17*a* of the detection cylindrical section 17 and the inner circumferential surface of the sensor attachment section 14 of the case main body 6 is achieved.

In this state, the sensor element 18 and the detection cylindrical section 17 are held down on the case main body 6 by the sensor hold-down member 19 of the sensor section 15. Here, the engaging sections 19*a* on the sides of the sensor hold-down member 19 engage with the hook sections 19*b* formed on the inner surface of the case main body 6. As a result, the sensor hold-down member 19 holds down and fixes the sensor element 18 on the case main body 6 with the small-diameter cylindrical section 17*a* and the large-diameter cylindrical section 17*b* of the detection cylindrical section 17 being pressed inside the sensor attachment section 14 of the case main body 6.

Then, the sensor element 18 of the sensor section 15 is electrically connected to the circuit section (not shown in the drawings) of the timepiece module 5 by the flexible wiring substrate 18*a* and, in this state, the timepiece module 5 is inserted from below into the case main body 6 and arranged therein. Here, the inner ends of the button shafts 3*b* of the plural push button switches 3 attached to the two o'clock side, four o'clock side, eight o'clock side, nine o'clock side, and ten o'clock side of the wristwatch case 1 are positioned corresponding to the contact plates (not shown in the drawings) of the timepiece module 5 so as to come in contact therewith.

In this state, the back cover 10 is attached to the lower part of the case main body 6 together with the packing 10*a*. Here, the hold-down section 10*b* provided while being inclined obliquely upward from the three o'clock side of the back cover is pressed against the inclined section 12*f* of the decorative member 12, and thereby holds down and fixes the decorative member 12 on the outer surface of the case main body 6. That is, the decorative member 12 is held and fixed between the case main body 6 and the hold-down section 10*b* while being temporarily fixed on the case main body 6 by the temporarily holding section 12*c*. By the above-described procedure, the wristwatch case 1 and the wristwatch are assembled.

Next, the usage of the wristwatch assembled as described above is described.

In this wristwatch, when a normal mode is selected by the plurality of push button switches 3 on the two o'clock side, the four o'clock side, the eight o'clock side, the nine o'clock side, and the ten o'clock side being selectively operated, the timepiece module 5 performs a normal operation.

More specifically, in the normal mode of this wristwatch, the timepiece movement (not shown in the drawings) of the timepiece module 5 moves the pointers to indicate a time of day, and the display section (not shown in the drawings) displays information regarding a time of day, a date, and a day of the week. Accordingly, this information regarding a time of day, a date, and a day of the week can be viewed from outside the wristwatch case 1 through the watch glass 8.

Also, in this wristwatch, when a sensor mode is selected by the plurality of push button switches 3 on the two o'clock side, the four o'clock side, the eight o'clock side, the nine o'clock side, and the ten o'clock side being selectively operated, the sensor device 4 detects pressure such as atmospheric pressure and water pressure outside the wristwatch case 1. In this detection, fluid such as gas or liquid outside the wristwatch case 1 is taken into the detection cylindrical section 17 of the sensor section 15 in the sensor attachment section 14 from the first flow port 21 of the flow route 16 through the flow path 23 thereof.

In addition, fluid such as gas or liquid outside the wristwatch case 1 is taken into the two second flow ports 22 of the flow route 16 from the buttonhole sections 9*a* of the two switch attachment sections 9 on the two o'clock side and the four o'clock side, and taken into the detection cylindrical section 17 of the sensor section 15 in the sensor attachment section 14 through the two second flow ports 22 and the flow path 23 of the flow route 16.

Then, the sensor element 18 of the sensor section 15 detects the pressure of the fluid in the detection cylindrical section 17 of the sensor section 15. Subsequently, information regarding this pressure detected by the sensor element 18 is provided to the circuit section (not shown in the drawings) of the timepiece module 5 by the flexible wiring board 18*a*, and displayed by an indication by the pointer (not shown in the drawings) of the timepiece movement of the timepiece module 5 and by the display section (not shown in the drawings).

The fluid such as gas or liquid taken into the detection cylindrical section 17 of the sensor section 15 in the sensor attachment section 14 as described above is discharged outside the wristwatch case 1 from the first flow port 21 through the first flow path 23*a* of the flow path 23, and also sent to the two second flow ports 22 from the first flow path 23*a* through the two second flow paths 23*b* so as to be discharged outside the wristwatch case 1 from the buttonhole sections 9*a* of the two switch attachment sections 9 on the two o'clock side and the four o'clock side through these two second flow ports 22.

Here, for example, when the left arm wearing the wristwatch is lowered, the three o'clock side of the wristwatch case 1 having the sensor device 4 becomes lower, whereby the fluid such as gas or liquid taken into the detection cylindrical section 17 of the sensor section 15 is easily discharged outside the wristwatch case 1.

Also, in a case where the user is walking and the left arm wearing the wristwatch is being repeatedly swung, the number of times that the two to four o'clock sides of the wristwatch case 1 become lower is increased. That is, the fluid such as gas or liquid taken into the detection cylindrical section 17 of the sensor section 15 is reliably discharged outside the wristwatch case 1 through the first flow port 21 or the second flow ports 22.

Moreover, even when the user is wearing the wristwatch on the right arm, the number of times that the two o'clock side becomes lower is increased by the user walking, whereby the fluid such as gas or liquid taken into the detection cylindrical section 17 of the sensor section 15 is easily discharged outside the wristwatch case through the second flow ports 22.

That is, fluid such as gas or liquid taken into the detection cylindrical section 17 of the sensor section 15 is reliably discharged outside the wristwatch case 1 from the first flow port 21 through the first flow path 23*a*, and also sent to the two second flow ports 22 from the first flow path 23*a* through the two second flow paths 23*b* so as to be reliably discharged outside the wristwatch case 1 from the buttonhole sections 9*a* of the two switch attachment sections 9 through these two second flow ports 22.

Also, when a foreign substance such as a particle whose diameter is equal to or shorter than the groove width of the first flow path 23*a* enters from the first flow port 21, this substance passes through the first flow path 23*a*, and is taken into the sensor attachment section 14 of the case main body 6. Then, this substance is discharged outside the wristwatch case 1 from the first flow port 21 through the first flow path 23*a*, and also sent to the two second flow ports 22 from the first flow path 23*a* through the two second flow paths 23*b* so as to be discharged outside the wristwatch case 1 from the buttonhole sections 9*a* of the two switch attachment sections 9 through these two second flow ports 22.

Similarly, when a foreign substance such as a particle whose diameter is equal to or shorter than the groove width of the first flow path 23*a* enters from each of the two second flow ports 22, these foreign substances pass through the second flow paths 23*b* and taken into the sensor attachment section 14 of the case main body 6 from the first flow path 23*a*. Then, these substances are discharged outside the wristwatch case 1 from the first flow port 21 through the first flow path 23*a*, and also sent to the two second flow ports 22 from the first flow path 23*a* through the two second flow paths 23*b* so as to be discharged outside the wristwatch case 1 from the buttonhole sections 9*a* of the two switch attachment sections 9 through these two second flow ports 22.

Also, when a foreign substance such as a particle whose diameter is larger than the groove width of the first flow path 23*a* enters from the first flow port 21, this foreign substance is stopped at the first flow path 23*a* so as not to be taken into the sensor attachment section 14. This foreign substance stopped at the first flow path 23*a* is discharged outside the wristwatch case 1 from the first flow port 21, and also sent to the two second flow ports 22 from the first flow path 23*a* through the two second flow paths 23*b* so as to be discharged outside the wristwatch case 1 from the buttonhole sections 9*a* of the two switch attachment sections 9 through these two second flow ports 22.

Similarly, when a foreign substance such as a particle whose diameter is larger than the groove width of the first flow path 23*a* and shorter than the groove width of each second flow port 22 enters from each of the two second flow ports 22, these foreign substances are stopped at the first flow path 23*a* so as not to be taken into the sensor attachment section 14. These foreign substances stopped at the first flow path 23*a* are sent to the two second flow ports 22 through the two second flow paths 23*b*, and discharged outside the wristwatch case 1 from the buttonhole sections 9*a* of the two switch attachment sections 9 through these two second flow ports 22.

Also, even in a case where a foreign substance which is too large is stuck in one of the first flow path 23*a* and the two second flow paths 23*b* and not discharged outside the wristwatch case 1, detection by the sensor section 15, the discharge of fluid such as gas or liquid, and the like are not greatly affected thereby if the remaining paths 23 are used.

As described above, the sensor device 4 of this wristwatch includes the wristwatch case 1 having the sensor attachment section 14, the sensor section 15 attached to the sensor attachment section 14, and the flow route 16 which has at least one first flow port 21 and one second flow port 22 which are flow ports formed in the wristwatch case 1 in a manner not to oppose the sensor section 15 or the sensor attachment section 14, and in which fluid can flow from the first flow port 21 or the second flow port 22 to the sensor section 15. As a result of this structure, the first flow port 21 and the second flow port 22 are formed at the positions not opposing each other, which prevents the lowering of the design flexibility.

In the case of the structure of the above-described conventional sensor device, the sensor housing body having the housed sensor, the foreign substance invasion prevention member, and the sensor cover are attached by the plurality of screws to the sensor attachment section of the wristwatch case while coaxially corresponding to one another. Accordingly, this structure has a problem in that the positions and shapes of inner or outer parts of the wristwatch are subject to constraints, whereby the design flexibility is lowered. In contrast with this conventional sensor device, the sensor device 4 of the wristwatch of the present invention prevents the lowering of design flexibility. More specifically, in the case of the sensor device 4 of the wristwatch according to the present invention, the first flow port 21 of the flow route 16 which leads fluid such as gas or liquid outside the wristwatch case 1 to the sensor section 15 is formed in the portion of the wristwatch case 1 at the position shifted from the sensor attachment section 14. Accordingly, the sensor attachment section 14 and the sensor section 15 are covered by the wristwatch case 1 and are not exposed to the outside of the wristwatch case 1. As a result of this structure, the outer appearance and design of the wristwatch case 1 are not subject to constraints due to the sensor attachment section 14 and the sensor section 15, whereby the lowering of the design flexibility can be prevented and the outer appearance and design of the wristwatch case 1 can be enhanced.

Also, in the case of the sensor device 4 of this wristwatch, the flow route 16 includes the first flow port 21 which is the first opening formed at the position shifted from the sensor attachment section 14, and the second flow ports 22 which are the second openings formed at the positions different from the position of the first flow port 21, whereby fluid such as gas or liquid outside the wristwatch case 1 can be favorably taken in from the first flow port 21 and the second flow ports 22 and favorably discharged outside the wristwatch case 1 from the first flow port 21 and the second flow ports 22.

Moreover, in the case of the sensor device 4 of this wristwatch, the first flow port 21 is formed at the position shifted from the sensor section 15 or the sensor attachment section 14 in the vertical direction of the wristwatch case 1 which is the front or back direction, and the second flow ports 22 are formed at the positions shifted from the sensor section 15 or the sensor attachment section 14 along the outer circumference of the wristwatch case 1. As a result of this structure, the positions of the first and second flow ports 21 and 22 can be reliably shifted with respect to the sensor attachment section 14, whereby the sensor attachment section 14 and the sensor section 15 can be reliably and favorably covered by the wristwatch case 1 so as not to be exposed to the outside of the wristwatch case 1.

Furthermore, in the case of the sensor device 4 of this wristwatch, the second flow ports 22 are formed in the side surface of the wristwatch case 1 while being connected to the corresponding switch attachment sections 9 to which the corresponding pushbutton switches 3 are attached. As a result of this structure, these second flow ports 22 can be reliably and favorably covered by the push button switches 3 attached to the switch attachment sections 9 so as not be seen from outside the wristwatch case 1.

Still further, in the case of the sensor device 4 of this wristwatch, each push button switch 3 has the button head section 3*a* and the button shaft 3*b*, and the button head section 3*a* is slidably arranged in the buttonhole section 9*a* of the corresponding switch attachment section 9. As a result of this structure, the second flow ports 22 connected to the buttonhole sections 9*a* can be reliably and favorably covered by the button head sections 3*a* arranged in the buttonhole sections 9*a* so as not be seen from outside the wristwatch case 1.

Yet still further, in the case of the sensor device 4 of this wristwatch, the wristwatch case 1 includes the case main body 6 and the exterior member 7. In addition, the first flow port 21, which is the first opening at the position shifted from the sensor section 15 or the sensor attachment section 14 in the front or back direction of the wristwatch case 1, that is, the vertical direction of the wristwatch case 1, is formed in the exterior member 7, and the flow route 16 excluding this first flow port 21 is formed between the case main body 6 and the exterior member 7. As a result of this structure, the second flow ports 22 and the flow path 23 in the flow route 16 can be favorably formed in the wristwatch case 1 such that only the first flow port 21 can be seen from outside the wristwatch case 1 and the second flow ports 22 and the flow path 23 cannot be seen from outside the wristwatch case 1.

Yet still further, in the case of the sensor device 4 of this wristwatch, the exterior member 7 includes at least the decorative member 12 which is the side part member, and the decorative member 12 is arranged on and attached to the outer surface of the case main body 6 while corresponding to the flow route 16. As a result of this structure, the flow route 16 can be favorably formed such that, by the decorative member 12, the flow route 16 excluding the first flow port 21 cannot be seen from outside.

Yet still further, in the case of the sensor device 4 of this wristwatch, the decorative member 12 that is the side part member is highly decorative and, by this decorative member 12 as well, the design of the wristwatch case 1 can be enhanced. More specifically, the decorative member 12 has a color that adds an accent to the wristwatch case 1, so that the outer appearance and design of the wristwatch case 1 can be enhanced by the decorative member 12. In addition, the decorative member 12 is a separate part independent from the exterior member 7, which simplifies the structure of the exterior case 11. As a result, the exterior case 11 and the decorative member 12 can be easily manufactured, whereby the exterior member 7 can be easily manufactured.

Yet still further, in the case of the sensor device 4 of this wristwatch, the first flow port 21, which is the first opening at the position shifted from the sensor attachment section 14 in the front or back direction of the wristwatch case 1, that is, the vertical direction of the wristwatch case 1, is formed between the exterior case 11 and the decorative member 12. As a result of this structure, the first flow port 21 can be easily formed in the wristwatch case 1.

That is, in the case of this sensor device 4, the first flow port 21 is constituted by the recessed groove 21*a* formed in the upper end portion of the decorative member 12 opposing the lower end portion of the exterior case 11 and the connection groove 21*b* formed in the inner surface portion of the decorative member 12 corresponding to this recessed groove 21*a*. As a result of this structure, by the decorative member 12, the first flow port 21 can be easily formed.

Also, among the plurality of recessed grooves 21*a*, the two recessed grooves 21*a* located to the sides of the middle recessed groove 21*a* are dummy grooves which are not connected to the flow path 23 of the flow route 16 by being blocked by the case main body 6. By these plural recessed grooves 21*a* for the first flow port 21, the design and the decorativeness can be enhanced.

Also, in the case of the sensor device 4 of this wristwatch, the decorative member 12 includes the temporarily holding sections 12*c*. Accordingly, when being arranged on the outer surface of the case main body 6, the decorative member 12 can be temporarily fixed on the outer surface of the case main body 6 by the temporarily holding sections 12*c*.

More specifically, each temporarily holding section 12*c* includes the hole section which is constituted by the long hole section 12*d* and the circular hole section 12*e* and into which the corresponding boss section 6*a* formed on the outer surface of the case main body 6 is inserted. When inserted into the circular hole section 12*e* of the hole section, this boss section 6*a* stretches the circular hole section 12*e* and the long hole section 12*d*, and then the stretched circular hole section 12*e* elastically holds the boss section 6*a*, whereby the decorative member 12 can be temporarily held on the outer surface of the case main body 6.

Also, in the case of the sensor device 4 of this wristwatch, the decorative member 12 is held between the hold-down section 10*b* of the back cover 10 which is a cover body attached to the undersurface of the case main body 6 and the case main body 6. As a result of this structure, the decorative member 12 temporarily held by the temporarily holding section 12*c* can be reliably and firmly held down and fixed by the hold-down section 10*b* of the back cover 10.

That is, the hold-down section 10*b* is provided while being inclined obliquely upward from the three o'clock side of the back cover 10. Accordingly, when the back cover 10 is attached to the lower part of the case main body 6, the inclined hold-down section 10*b* is pressed against the inclined section 12*f* of the decorative member 12 temporarily held by the temporarily holding section 12*c*, whereby the decorative member 12 can be reliably held down and fixed on the outer surface of the case main body 6.

Also, in this wristwatch, the first flow port 21 and the second flow ports 22 for the sensor device 4 are formed in the side surface portions of the wristwatch case 1 located in radial directions from the center of the wristwatch case 1 which is a timepiece main body. As a result of this structure, by the wristwatch case 1 being tilted such that the first flow port 21 and the second flow ports 22 are oriented downward, fluid taken in the flow path 23 for the sensor device 4 and the sensor section 15 can be favorably discharged from the first flow port 21 and the second flow ports 22.

Moreover, in the case of this wristwatch, by being formed in the side portions of the wristwatch case 1 between a substantially two o'clock side and a substantially four o'clock side, the first flow port 21 and the second flow ports 22 are oriented downward when an arm wearing the wristwatch case 1 is lowered. As a result of this structure, fluid taken into the flow path 23 for the sensor device 4 and the sensor section 15 can be reliably and favorably discharged from the first flow port 21 and the second flow ports 22.

Furthermore, in this wristwatch, the first flow port 21 is formed in the side portion of the wristwatch case 1 on a substantially three o'clock side, and the second flow ports 22 are formed in the side portions of the wristwatch case 1 different from that of the first flow port 21. As a result of this structure, by the wristwatch case 1 being tilted such that the first flow port 21 is oriented downward, fluid taken into the flow path 23 for the sensor device 4 and the sensor section 15 can be reliably and favorably discharged from the first flow port 21 and the second flow ports 22.

In the above-described embodiment, the decorative member 12 is formed as a separate part. However, the present invention is not limited thereto, and a structure may be adopted in which the decorative member 12 and the exterior case 11 are integrally formed.

Also, in the above-described embodiment, the second flow ports 22 of the flow route 16 are formed in the two portions of the wristwatch case 1 on the two o'clock side and the four o'clock side. However, the present invention is not limited thereto, and a structure may be adopted in which only the second flow port 22 on the two o'clock side of the wristwatch case 1 or only the second flow port 22 on the four o'clock side of the wristwatch case 1 is formed.

Moreover, in the above-described embodiment, the sensor device 4 is provided on the three o'clock side of the wristwatch case 1. However, the sensor device 4 is not necessarily required to be provided on the three o'clock side, and may be provided in an arbitrary circumferential portion of the wristwatch case 1 between the one o'clock side and the twelve o'clock side.

Furthermore, in the above-described embodiment, the sensor element 18 of the sensor device 4 is a pressure sensor which detects pressure. However, the sensor element 18 of the present invention is not necessarily required to be a pressure sensor, and may be a temperature sensor which detects temperature.

Still further, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a wall clock. In addition, the present invention is not necessarily required to be applied in timepieces, and can be applied in electronic devices such as cell-phones and portable information terminals.

While the present invention has been described with reference to the preferred embodiments, it is intended that the invention be not limited by any of the details of the description therein but includes all the embodiments which fall within the scope of the appended claims.

What is claimed is:

1. A sensor device comprising:

a case main body;

a sensor provided in the case main body; and an exterior member which is provided on a circumferential portion of the case main body, and has at least one first opening at a position shifted in a predetermined direction from an opposing direction of the sensor, the exterior member and the at least one first opening covering an outer circumferential part of the case main body, wherein a flow route where fluid is flowable into the sensor through the at least one first opening is formed between the case main body and the exterior member.

2. The sensor device according to claim 1, wherein at least one second opening different from the first opening is formed at a position that is not opposing the sensor and located between the case main body and the exterior member, and wherein the flow route is connected to the first opening, the second opening, and the sensor.

3. The sensor device according to claim 2, wherein the first opening and the second opening are at positions not opposing each other.

4. The sensor device according to claim 3, wherein the first opening is at a position shifted from the sensor in an upward direction or a downward direction, and wherein the second opening is at a position shifted from the sensor along outer circumference of the case main body.

5. The sensor device according to claim 2, further comprising:

a switch provided on a side portion of the case main body, wherein the second opening is located behind the switch.

6. The sensor device according to claim 1, wherein the exterior member includes a side part member which is arranged on a side portion of the case main body, and wherein the flow route is between the side part member and the case main body.

7. The sensor device according to claim 6, wherein the side part member is held and fixed between a hold-down portion of a cover body provided under the case main body and the case main body.

8. A timepiece comprising the sensor device according to claim 1.

9. The timepiece according to claim 8, wherein at least one second opening different from the first opening is formed at a position that is not opposing the sensor and located between the case main body of the sensor device and the exterior member, and wherein the first opening and the second opening are in side surface portions of a timepiece main body located in radial directions from center of the timepiece main body.

10. The timepiece according to claim 9, wherein the first opening and the second opening are in the side surface portions of the timepiece main body located between a substantially two o'clock side and a substantially four o'clock side.

11. The timepiece according to claim 10, wherein the first opening is in a first side surface portion of the timepiece main body located on a substantially three o'clock side, and wherein the second opening is in a second side surface portion of the timepiece main body which is different from the first side surface portion where the first opening is located.

* * * * *